US008732177B1

(12) United States Patent  
Chinnasamy et al.

(10) Patent No.: US 8,732,177 B1
(45) Date of Patent: May 20, 2014

(54) RANKING ONLINE LISTINGS

(75) Inventors: Sivakumar Chinnasamy, Billerica, MA (US); Jeesmon Jacob, Nashua, NH (US); Tsu-Jung Kung, Concord, MA (US); Than Kim-Thi Nguyen, Arlington, TX (US)

(73) Assignee: JPMorgan Chase Bank, N.A., Houston, TX (US)

( * ) Notice: Subject to any disclaimer, the term of this patent is extended or adjusted under 35 U.S.C. 154(b) by 555 days.

(21) Appl. No.: 12/767,057

(22) Filed: Apr. 26, 2010

(51) Int. Cl.
*G06F 17/30* (2006.01)

(52) U.S. Cl.
USPC .......................................... 707/749; 707/751

(58) Field of Classification Search
USPC .................................. 707/749, 999.007, 751
See application file for complete search history.

(56) References Cited

U.S. PATENT DOCUMENTS

| | | | | |
|---|---|---|---|---|
| 7,697,791 B1 * | 4/2010 | Chan et al. | ..................... | 382/305 |
| 7,698,331 B2 * | 4/2010 | Carson et al. | .................. | 707/728 |
| 7,844,493 B1 * | 11/2010 | Veach et al. | ................ | 705/14.46 |
| 7,930,206 B2 * | 4/2011 | Koningstein | ............... | 705/14.45 |
| 8,229,915 B1 * | 7/2012 | Lloyd et al. | ................... | 707/709 |
| 8,244,585 B1 * | 8/2012 | Huang et al. | ................ | 705/14.41 |
| 8,359,238 B1 * | 1/2013 | Kauchak et al. | ........... | 705/14.66 |
| 8,417,569 B2 * | 4/2013 | Gross | ........................ | 705/14.41 |
| 2005/0065928 A1 * | 3/2005 | Mortensen et al. | ............... | 707/5 |
| 2005/0154717 A1 * | 7/2005 | Watson et al. | ..................... | 707/3 |
| 2005/0154718 A1 * | 7/2005 | Payne et al. | ....................... | 707/3 |
| 2006/0161534 A1 * | 7/2006 | Carson et al. | ..................... | 707/3 |
| 2008/0275770 A1 * | 11/2008 | Kitts | ............................... | 705/14 |
| 2008/0288481 A1 * | 11/2008 | Zeng et al. | ......................... | 707/5 |
| 2009/0164419 A1 * | 6/2009 | Taylor et al. | ...................... | 707/3 |
| 2010/0049609 A1 * | 2/2010 | Zhao et al. | ................. | 705/14.58 |
| 2010/0082421 A1 * | 4/2010 | Tuladhar et al. | ........... | 705/14.41 |
| 2011/0066496 A1 * | 3/2011 | Zhang et al. | ................ | 705/14.53 |
| 2011/0078049 A1 * | 3/2011 | Rehman et al. | ............... | 705/27.1 |
| 2011/0131500 A1 * | 6/2011 | Ohazama | ....................... | 715/738 |
| 2011/0184941 A1 * | 7/2011 | El-Charif et al. | ............. | 707/723 |
| 2011/0231241 A1 * | 9/2011 | Kesari et al. | ................ | 705/14.42 |
| 2011/0238486 A1 * | 9/2011 | Liu et al. | .................... | 705/14.42 |

* cited by examiner

*Primary Examiner* — Phuong Thao Cao

(74) *Attorney, Agent, or Firm* — Bejin VanOphem & Bieneman PLC

(57) ABSTRACT

A search query is received. One or more listings is identified responsive to the search query. For each of the one or more of listings, the following are determined: a relevancy score based on one or more parameters in the search query, an expected click through rate, and at least one of a content density boost that is based on one or more fields that are included in or excluded from the listing and a geography type boost that is based on a comparison of one or more geography parameters of the query to one or more geography parameters of the listing. For each of the one or more listings, a performance score is calculated based on the relevancy score, the expected click through rate, and at least one of the content density boost and the geography type boost.

21 Claims, 3 Drawing Sheets

RANKING ONLINE LISTINGS

BACKGROUND

With the proliferation of the World Wide Web and data networks such as the Internet, consumers often turn to their computers when searching for information relating to products or places, rather than using traditional printed directories. Providers such as online search engines, directories of advertisers, and the like, often charge advertisers to have listings included in a set of search results. In some instances, an advertiser pays for a listing or an advertisement to be displayed on a webpage that does not include a set of search results. In this case, an advertiser is charged simply for having the advertisement displayed on the webpage. Further, advertisers are often charged on a per-click basis, meaning that every time an online user clicks on an advertisement, the advertiser is charged. A provider may wish to display listings in a manner to maximize its own revenue as well as provide greater benefit to advertisers.

DETAILED DESCRIPTION

Overview

Figure 1:
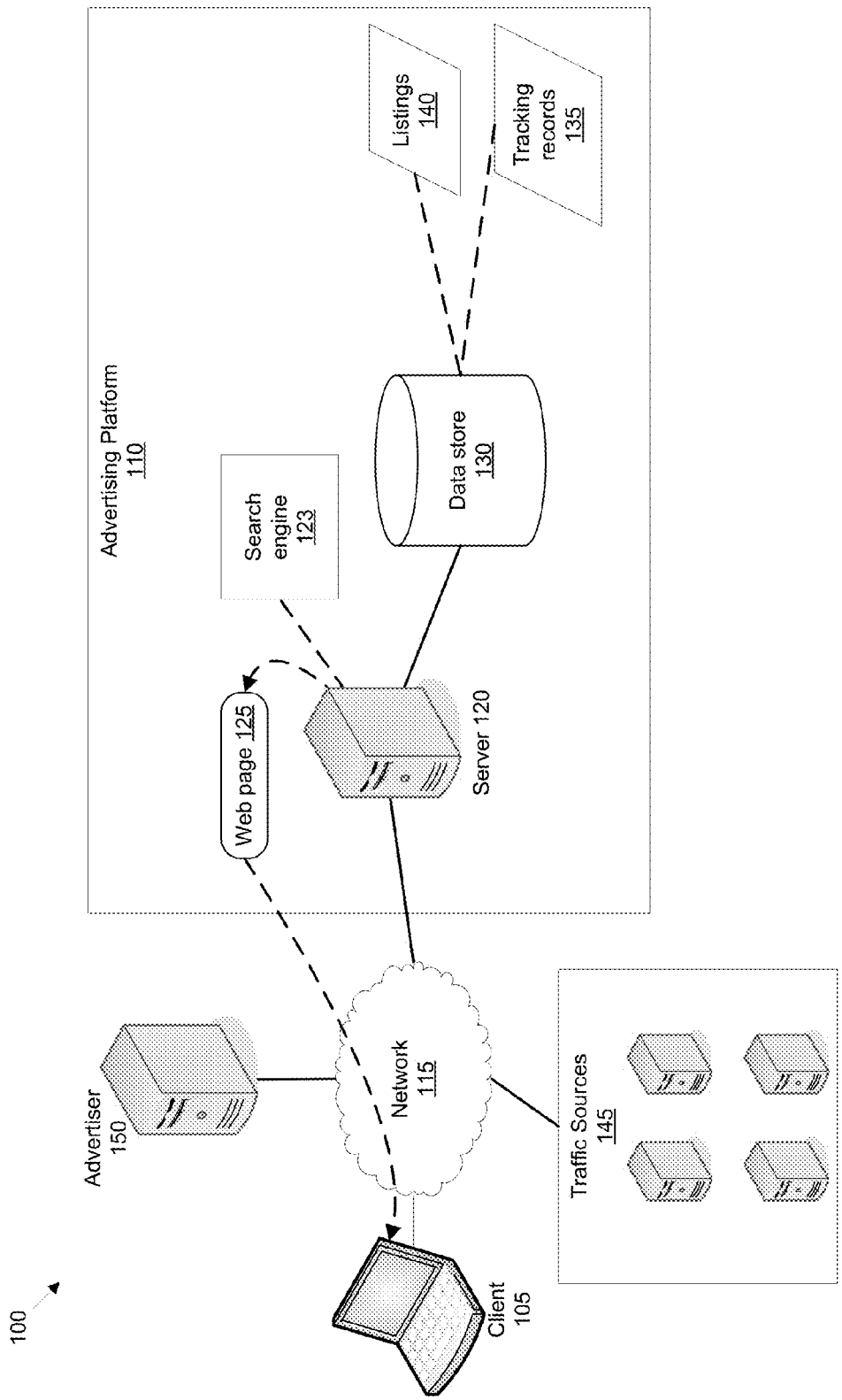
FIG. 1 illustrates an exemplary advertising distribution system.

FIG. 1 illustrates an exemplary advertising distribution system 100 in which a client 105 may communicate with an advertising platform 110 via a network 115. Client 105 may be any one of a number of computing devices that allow a user to communicate via network 115. For example, client 105 may include a desktop computer, a laptop computer, a mainframe computer, a mini-computer, a cell phone, personal digital assistant, or other similar device. Client 105 may also include one or more software applications for facilitating such communication over network 115, e.g., a web browser or the like. In addition, while only one client 105 is shown in FIG. 1, many different clients 105 may be connected to network 115 and submit queries and receive responses using system 100. Likewise, network 115 is generally but not necessarily a packet network, and may be any suitable network for sending and receiving data, such as the Internet, local area network, wide area network, cellular network, etc.

Advertising platform 110 or components thereof, such as a server 120, may communicate directly or indirectly through network 115 with other system 100 components such as, but not limited to, one or more advertisers 150. Possibly, but not necessarily, client 105 may be referred to platform 110 by one or more traffic sources 145. Further, advertising platform 110, generally via a server 120, may provide one or more web pages 125 to client 105, generally via network 115. Also, server 120 is generally in communication with a data store 130.

Server 120 is described herein as a "server" for convenience, and not by way of limitation, and may include any general-purpose computing device along with operating software and other sets of computer executable instructions to carry out steps described herein. In one exemplary implementation, server 120 includes features of a web server. In general, server 120 receives a request for content, e.g., a search query, a request for a webpage, etc. Server 120 generally then queries a source for requested content, such as data store 130, and provides content in response to the request.

Server 120 may include executable instructions comprising a search engine 123. Search engine 123 may be a generally available product for indexing and retrieving information in response to search queries such as the Lucene search engine. Search engine 123 may provide an index or the like for listings 140 stored in data store 130, and may further provide the capability of retrieving listings 140 in response to search queries.

Although not illustrated in FIG. 1, server 120 and data store 130 may be included within a single computing device, or, as illustrated in FIG. 1, may be included on separate computing devices. Further, each may include clusters of computing devices for purposes of redundancy, processing efficiency, etc. In addition to providing features of a web server and/or search engine 123, server 120 generally also includes one or more sets of computer executable instructions for providing other operations including such as described herein.

As mentioned above, data store 130 may be included in a separate computing device other than server 120, or may be a software application executing on server 120. Data store 130 further includes a plurality of listings 140 that may be provided in response to a user search query, such query possibly submitted via a traffic source 145. Each listing 140 generally relates to a particular advertiser 150. An advertiser 150 generally may be associated with one or more listings 140. A listing 140 may also include fields containing information about the advertiser 150, such as, without limitation, some or all of the following: a name, address, telephone number, e-mail address, web site address, brief description, etc. Further, a listing 140 may include one or more hyperlinks, some or all of which may be associated with one or more of the foregoing information included in the listing. When a user selects one of the hyperlinks, platform 110 may record a charge to the advertiser 150. In some implementations, listings 140 are banner advertisements, and moreover in some implementations listings 140 may include both listings with text and images as well as advertisements that include only image data.

Advertiser 150 may be an online merchant, a website, or other entity wishing to utilize listings 140.

Traffic source 145 is any web site or the like that refers traffic, e.g., search queries and the like, e.g., from clients 105, to advertising platform 110. For example, traffic source 145 could be an advertiser 150, an online directory, an online merchant, or any website or the like that includes an interface for submitting queries to advertising platform 110. For example, traffic source 145 could include an input form for submitting queries through client 105, such that when queries are submitted they are sent back to server 120 and/or data store 130 to retrieve listings 140. Further, listings 140 may be returned to a traffic source 145 for display within a web page or other interface presented by the traffic source 145. In some cases, a traffic source 145 may be referred to as a "partner," or a "traffic partner."

Although communication from advertising platform 110 with other elements in system 100 is illustrated in FIG. 1 as being through network 115, it should be understood that system 100 may include other data networks (not shown) through which communication may be established. It should further be understood that various implementations of the system 100 may include a variety of components, information types, and interactions, including, but in no way limited to, those explicitly mentioned herein.

Computing devices such as those discussed herein generally each include instructions executable by one or more processors. For example, processes disclosed herein may be implemented as sets of instructions stored in memories or other media of computers such as server 120, etc., and executable by one or more processors included in such computers. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, tangible media such as a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein, including data store 130, may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language.

RANK SCORE

For each, or at least some, of the listings 140 in data store 130, a "rank score" may be calculated. The rank score of a listing 140 is a measure of desirability, from the perspective of the provider of platform 110, of providing the listing 140 in response to a request from client 105. In general, the provider will wish to maximize its revenue, and also to provide value to its advertisers 150. Therefore, the rank score is designed to provide listings 140 that are likely to be selected, e.g., clicked on, by a user of client 105, and at the same time to maximize revenue for the provider of platform 110. (Note that the term "click" as used herein is not limited to a literal "click" of a computer mouse or pointing device and could refer to any user selection of a listing 140 or other link or item referred to as the object of a "click.") For example, the rank score may be based on a probability that the listing 140 will receive a click if displayed in a set of search results, along with the maximum bid that the advertiser 150 has agreed to make to have the listing 140 displayed. That is, $$RS = PS * Bid_{MAX} \quad \text{(Equation 1).}$$

In Equation 1, RS represents the rank score. PS represents a value known as "performance score," which is calculated as described below and is intended to approximate or stand in for the probability that a listing 140 will receive a click. Further, $Bid_{MAX}$ represents the maximum bid that the advertiser 150 has agreed to make to have the listing 140 displayed, if a user clicks on, i.e., selects the listing 140. That is, $Bid_{MAX}$ represents the maximum amount of revenue that the provider of platform 110 can hope to realize from an instance in which the listing 140 is displayed.

A performance score PS may be calculated for a listing 140, or for an advertising campaign including the listing 140 and possibly also including similar listings 140 associated with an advertiser 150. An advertising campaign generally refers to an advertiser 150 selecting one or more listings 140 to be included in data store 130 for possible inclusion in sets of search results for a given period of time.

The performance score PS may be determined by use of four weighted parameters as follows:

$$PS = W_1 * SRS + W_2 * CTR_{EXPECTED} + W_3 * CDB + W_4 * GTB \quad \text{(Equation 2).}$$

In Equation 2, $W_1$, $W_2$, $W_3$, and $W_4$ are weighting factors that generally have decimal values that sum to unity. $W_1$, $W_2$, $W_3$, and $W_4$ thus may be thought of as percentages, summing to 100%, that are assigned to their respective parameters. In some cases, one or more of $W_1$, $W_2$, $W_3$, and $W_4$ could be set to zero, i.e., one or more of the four parameters of PS shown above could be omitted in the calculation of PS.

$W_1$, $W_2$, $W_3$, and $W_4$ may be empirically determined. For example, for a set of historical data, each of the weights may in turn be set to "1," i.e., to 100%, and a Performance Score thereby determined for each listing 140 in the historical data. Rank Scores may then be calculated for each listing 140, and the listings 140 may then be deployed in search results on a test basis. Greater weight may be given to components of the performance score according to click-through rates obtained when a respective weight is set to 1, i.e., weights resulting in higher click-through rates for listings 140 in the aggregate may be used. An exemplary process for determining weights $W_1$, $W_2$, $W_3$, and $W_4$ is described below with respect to FIG. 4.

SRS represents a "search relevancy score" that may be provided by search engine 123 based on a number and type of keyword matches between query terms and terms in a listing 140 as well as possibly related listings 140, i.e., listings 140 grouped together by an advertiser 150 to form an advertising campaign. $CTR_{EXPECTED}$ represents an "expected click through rate" for the listing 140. CDB represents a "content density boost," which is a statistical measure of the impact of a presence of a particular type of field in a listing 140, e.g., the impact of a data field such as a telephone number, an address, fields providing user reviews relating to the listing 140, etc., for specific categories of listings 140, or for listings 140 including a particular keyword or keywords. The purpose of the content density boost CDB is to raise the performance scores of listings 140 that include content more likely to result in a click-through by a user of client 105. GTB represents a "geography type boost" that provides a measure of the geographic importance of a listing 140 based on parameters of a query.

The search relevancy score SRS may be provided at runtime, i.e., when a query has been submitted and before responses to the query are returned. For example, search engine 123 may be configured to provide the SRS, search engines such as the Lucene search engine generally being configurable to provide the SRS. The SRS may be based, for example, on a degree to which key words in a search query match words in a listing 140.

The expected click through rate $CTR_{EXPECTED}$ for a listing 140 is generally based on historic click through-rates for campaigns using listings similar to the listing 140. For example, $CTR_{EXPECTED}$ might be determined for a particular set of geographic, category, and/or keyword parameters for a previous campaign of the advertiser 150 and/or involving the listing 140. $CTR_{EXPECTED}$ generally should be based on a history for a listing 140, or a campaign, for a period of time sufficient to provide a statistically significant number of times that a listing 140, or listings 140 from a campaign, have been displayed. For example, one or two weeks worth of historical data may suffice to provide a statistically significant computation of $CTR_{EXPECTED}$.

Further, $CTR_{EXPECTED}$ may be position-normalized, i.e., may take into account the position of a listing 140 in a set of listings 140 at the time that the listing 140 received the various clicks included in the expected click through rate. For example, $CTR_{EXPECTED}$ may be negatively, or relatively lowly, weighted for listings 140 that received a click when in higher positions, and positively, or relatively highly, weighted for listings 140 that received a click when in lower positions. Thus, expected click-through rates for listings 140 may be determined based on historical data including clicks received when the listings 140 were in various positions.

The Content Density Boost CDB may be calculated for a particular listing 140 field i, and for a particular category c, as follows:

$$CDB_{[FIELD_i, CATEGORY_c]} = \frac{AvgCTR_{[FIELD_i, CATEGORY_c]}}{AvgCTR_{[CATEGORY_c]}}. \quad \text{(Equation 3)}$$

That is, the Content Density Boost CDB for listings 140 including a particular field, e.g., telephone number, and a particular category, e.g., restaurants, is determined by dividing the average click through rate for listings 140 including the field and the category by the average click through rate for listings 140 that do not include the field or the category. It is to be understood that Equation 3 could be modified to determine a Content Density Boost for a particular field and geography combination, for a field, category, and geography combination, etc. Further, a Content Density Boost may be modified according to parameters submitted in a search query. For example, listings 140 having street address fields may be given higher Content Density Boosts for searches that specify a local geographic scope as opposed to a wider, e.g., national geographic scope. That is, as reflected in Equation 3, CDB may vary for particular fields, and may be higher for fields associated with higher click through rates in a category than fields associated with lower click through rates in the category.

Further, a content density boost may be calculated for all fields in a category, e.g., as follows:

$$\sum_{i=1...n} CDB_{[FIELD_i, CATEGORY_c]} = \sum_{i=1...n} \frac{\text{Mean } CTR \text{ of Campaigns}_{(category,c)} \text{ with field}_{(i)}}{\text{Mean } CTR \text{ of Campaigns}_{(category,c)} \text{ without the field}_{(i)}}. \quad \text{(Equation 4)}$$

Thus, a cumulative content density boost applied to a listing 140 in a category c may be calculated as shown in Equation 4.

Geography Type Boost GTB may be calculated in a number of ways. For example, GTB could be based on a ranking of proximity of a listing parameters specified in a query. For example, if a query searched for restaurants in Detroit, a listing 140 associated with Detroit might have a higher GTB than a restaurant in Birmingham, a suburb of Detroit, which in turn would have a higher GTB than a restaurant on the west side of Michigan. GTB could also be binary, e.g., zero or one. For example, some listings 140 might carry a designation that they are only pertinent to a particular locality, e.g., the state of Michigan. Therefore, for queries that specified a national scope, or a scope other than the state of Michigan, the GTB for these listings 140 might be set to zero. On the other hand, for such a query, listings 140 associated with the state of Michigan would, in this example, have a GTB of one.

In one embodiment, listings 140 may fall into one of four geographic categories: local, metro, state, or national. Search queries may likewise be categorized. For example, a query could specify Waltham, Mass., and thereby be classified as a local query. A specification of "greater Boston" would be a metro level query. A specification of "Massachusetts" would be a state level query. A national query could also be specified, or could be the default if no geographic scope for a query was specified. In this embodiment, GTB could be assigned values according to the following table:

TABLE 1

| Listing Geography | Query Geography | | | |
|---|---|---|---|---|
| | Local | Metro | State | National |
| Local | H | M | N | N |
| Metro | H | H | M | N |
| State | M | H | H | M |
| National | L | M | H | H |

In Table 1, "Listing Geography" refers to a geographic categorization of a listing 140, while "Query Geography" refers to a geographic categorization of a query. Values H, M, L, and N represent values, e.g., high, medium, low, and nil values, that may be assigned to GTB for a combination of a listing 140 geography and a query geography. For example, possible values are H=1, M=0.75, L=0.25, and N=0.

As mentioned above, a search relevancy score may be dynamically provided by search engine 123. On the other hand, values such as click through rates and content density boosts may be computed for a statistically significant set of data, e.g., data accumulated over a period of time such as a week, two weeks, etc. One possible process for computing a rank score is described below with respect to FIG. 3.

Figure 2:
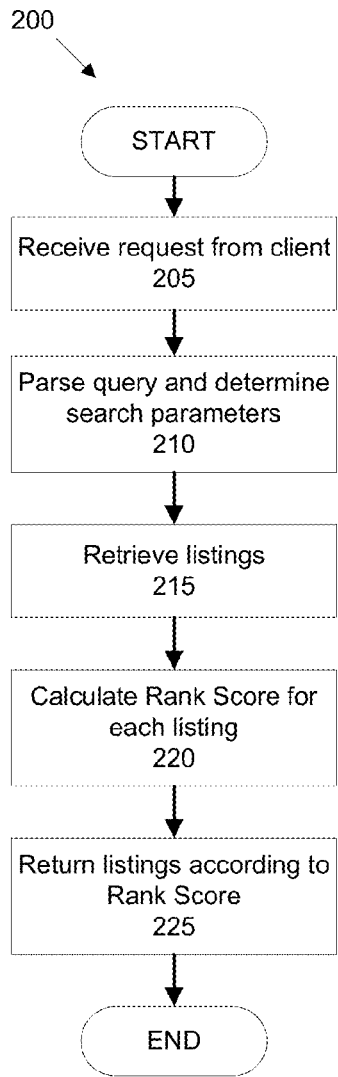
FIG. 2 illustrates an exemplary process for providing listings in response to a search query and according to a rank score assigned to each provided listing.

FIG. 2 illustrates an exemplary process 200 for providing listings 140 in response to a search query and according to a rank score assigned to each provided listing 140.

Process 200 begins in a step 205, in which server 120 receives a request, or query, for listings from client 105. Note that, although process 200 is discussed with respect to a request received from client 105, requests for listings 140 could also be received from a traffic source 145.

Next, in step 210, the query received in step 205 is parsed to determine search parameters. For example, a query could include one or more geographic parameters, e.g., city, state, zip, etc., one or more category parameters, e.g., type of business, etc., one or more keywords, etc. Server 120 is generally configured to parse a query to identify one or more such parameters in the query. If search parameters cannot be identified an error condition (not shown in FIG. 2) may result.

Next, in step 215, server 120 retrieves, generally from data store 130, listings 140 determined to be responsive to the query received in step 205. As mentioned above, search engine 123 may be used to retrieve listings 140.

Next, in step 220, server 120 calculates a Rank Score for each listing retrieved in step 215. A process for calculating a Rank Score is discussed below with respect to FIG. 3.

Next, in step 225, server 120 returns listings 140 retrieved in step 215, and sorted according to Rank Score in step 220, to client 105. Generally, listings 140 are sorted from highest to lowest Rank Score, although listings 140 could be sorted according to Rank Score according to some other factor in addition to Rank Score, or could be sorted in some other manner. For example, listings 140 could be arranged into tiers according to Rank Score, and could be presented in random order or some other order within the tiers.

Following step 225, process 200 ends.

Figure 3:
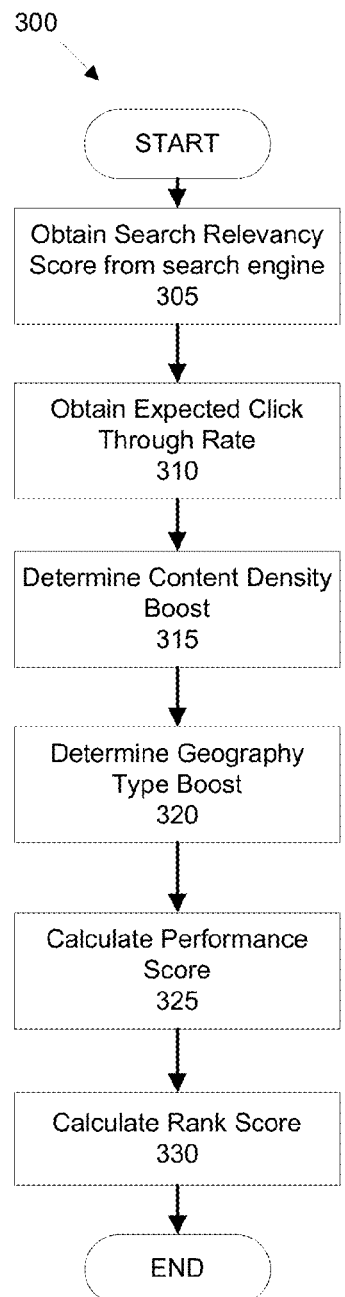
FIG. 3 illustrates an exemplary process for calculating a rank score for a listing.

FIG. 3 illustrates an exemplary process 300 for calculating a Rank Score for a listing 140. Process 300 begins in a step 305, in which server 120 obtains a Search Relevancy Score from search engine 123 for the listing 140.

Next, in step 310, server 120 obtains an expected click through rate for the listing 140.

Next, in step 315, server 120 determines the Content Density Boost to be applied to the Performance Score for the listing 140. For example, a Content Density Boost may be applied as calculated in Equation 4 above.

Next, in step 320, server 120 determines the Geography Type Boost to be applied to the Performance Score for the listing 140.

Next, in step 325, server 120 calculates a Performance Score for the listing 140, generally using values obtained in steps 305, 310, and 315, and generally applying weights as discussed above.

Next, in step 330, server 120 calculates a Ranked Score for the listing 140.

Following step 330, process 300 ends.

Figure 4:
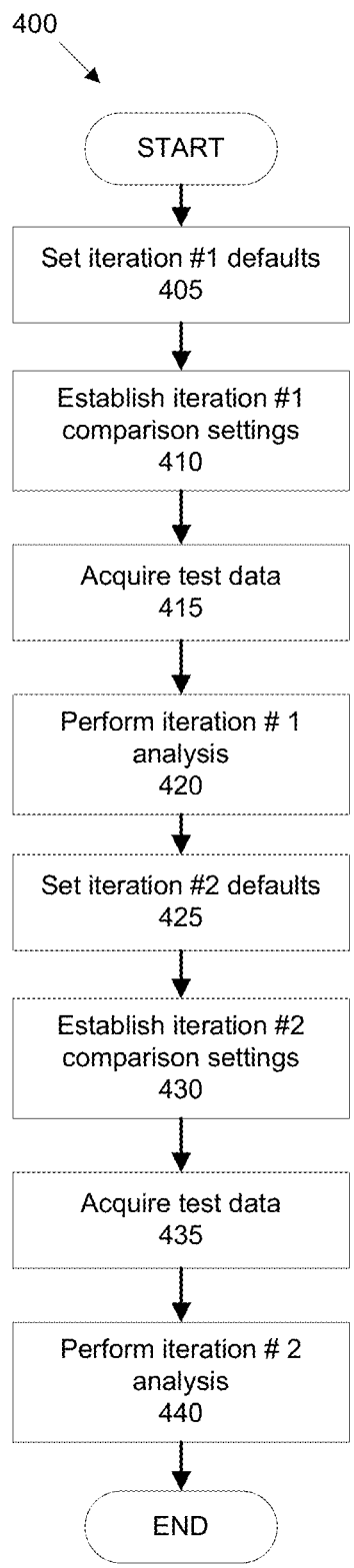
FIG. 4 illustrates an exemplary process for determining weights used in calculating a Performance Score.

FIG. 4 illustrates an exemplary process 400 for determining weights $W_1$, $W_2$, $W_3$, and $W_4$ as used in calculating a Performance Score PS as in Equation 2 above. FIG. 4 illustrates an exemplary process 400 for determining weights $W_1$, $W_2$, $W_3$, and $W_4$ as used in calculating a Performance Score PS as in Equation 2 above. Process 400 begins in a step 405, in which default values for the weights $W_1$, $W_2$, $W_3$, and $W_4$ are set. For example, possible default settings are $W_1=0.3$, $W_2=0.3$, $W_3=0.3$, $W_4=0.1$.

Next, in step 410, so-called comparison settings, sometimes also referred to as isolation settings, may be established for each of the weights. For example, a comparison setting for a weight $W_1$, could mean setting the value of the weight to 1, while setting the values of all other weights to zero, e.g., $W_1=1$, $W_2=0$, $W_3=0$, $W_4=0$. Comparison settings may be established for one or more of the weights; generally, comparison settings are established for each of the weights $W_1$, $W_2$, $W_3$, $W_4$.

Next, in step 415, test data is acquired with respect to each of the comparison settings, and the default settings. That is, system 100, or a comparable test environment, may be operated by using PS configured respectively with weights $W_1$, $W_2$, $W_3$, and $W_4$ set to the default settings, and to each of the comparison settings. For example, test data could be acquired over a period of days, or weeks. Further, test data could be acquired with respect to all or only some of the weights. For example, test data could be acquired with respect to only weights $W_1$, $W_2$, and $W_3$, where the remaining weight, $W_4$, was to be given a lower value because its parameter had been determined to be of less importance for business or other reasons.

Next, in step 420, test data is analyzed. For example, click-through rates for listings 140 could be aggregated for each of the respective configurations of system 100 associated with respective configurations of the weights $W_1$, $W_2$, $W_3$, and $W_4$. Then new values for the weights $W_1$, $W_2$, $W_3$, and $W_4$ could be set based on this analysis. For example, if the system 100 generated higher click-through rates when a first weight $W_1$ was set to 1, then that weight $W_1$ might be given a higher value. Similarly, if the system 100 generated relatively low click-through rates when a third weight $W_3$ was set to 1, that weight might be given a relatively lower value.

Step 420 completes a first iteration of establishing values for weights $W_1$, $W_2$, $W_3$, and $W_4$. These values could be used in a production environment, although generally values for the weights $W_1$, $W_2$, $W_3$, and $W_4$ are refined through two or more iterations. Accordingly, step 425 may follow step 420, and may include setting values of weights $W_1$, $W_2$, $W_3$, and $W_4$ for a next iteration, e.g., to values determined in step 420.

With the values set in step 425, steps 430, 435, and 440 may follow step 425, and may be executed as described above with respect to steps 410, 415, and 420, respectively. Values for weights $W_1$, $W_2$, $W_3$, and $W_4$ determined in step 440 may be used in a production environment, in which case process 400 ends following step 440, or the values may be used for yet a further iteration to refined the values of the weights $W_1$, $W_2$, $W_3$, and $W_4$, and process 400 may continue, although not shown in the FIG. 4.

As mentioned above, values for the weights could be determined in a variety of ways other than process 400. For example, the values could be determined randomly, on a rotating basis, or could be assigned according to business rules that waited certain factors, e.g., geography, as more important than others in determining a Performance Score.

CONCLUSION

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, by a computer, a search query;
   identifying, by the computer, one or more listings responsive to the search query;
   determining, by the computer, for each of the one or more listings, a relevancy score based on one or more parameters in the search query, an expected click through rate, and a content density boost for a listing category that is a ratio of a click-through rate when a particular type of field is included in a listing in the listing category to a click-through rate when the particular type of field is excluded from a listing in the listing category; and
   calculating, by the computer, for each of the one or more listings, a performance score based at least in part on the relevancy score, the expected click through rate, and the content density boost.

2. The method of claim 1, further comprising calculating, for each of the one or more listings, a rank score based on the performance score for the listing and a maximum bid amount for the listing.

3. The method of claim 2, further comprising sorting the one or more listings according to the rank score calculated for each of the one or more listings, and providing the one or more sorted listings in response to the search query.

4. The method of claim 1, further comprising applying one or more weighting factors to at least one of the relevancy score, the expected click through rate, and the content density boost, when calculating the performance score.

5. The method of claim 1, wherein the expected click through rate for a listing is normalized according to a position of the listing in a set of listings when the listing was selected.

6. The method of claim 1, further comprising adjusting the content density boost based on at least one of the one or more parameters in the search query.

7. The method of claim 1, further comprising:
   determining, for each of the one or more listings, a geography type boost that is based on a comparison of one or more geography parameters of the search query to one or more geography parameters of the listing; and
   calculating the performance score based on the geography type boost in addition to the relevancy score, the expected click through rate, and the content density boost.

8. A non-transitory computer-readable medium embodying a set of computer-executable instructions, the instructions comprising instructions for:
   receiving a search query;
   identifying one or more listings responsive to the search query;
   determining, for each of the one or more listings, a relevancy score based on one or more parameters in the search query, an expected click through rate, and a content density boost for a listing category that is a ratio of a click-through rate when a particular type of field is included in a listing in the listing category to a click-through rate when the particular type of field is excluded from a listing in the listing category; and
   calculating, for each of the one or more listings, a performance score based at least in part on the relevancy score, the expected click through rate, and the content density boost.

9. The non-transitory computer-readable medium of claim 8, the instructions further comprising instructions for calculating, for each of the one or more listings, a rank score based on the performance score for the listing and a maximum bid amount for the listing.

10. The non-transitory computer-readable medium of claim 9, the instructions further comprising instructions for sorting the one or more listings according to the rank score calculated for each of the one or more listings, and providing the one or more sorted listings in response to the search query.

11. The non-transitory computer-readable medium of claim 8, the instructions further comprising instructions for applying one or more weighting factors to at least one of the relevancy score, the expected click through rate, and the content density boost, when calculating the performance score.

12. The non-transitory computer-readable medium of claim 8, wherein the expected click through rate for a listing is normalized according to a position of the listing in a set of listings when the listing was selected.

13. The non-transitory computer-readable medium of claim 8, the instructions further comprising instructions for adjusting the content density boost based on at least one of the one or more parameters in the search query.

14. The non-transitory computer-readable medium of claim 8, the instructions further comprising instructions for:
   determining, for each of the one or more listings, a geography type boost that is based on a comparison of one or more geography parameters of the search query to one or more geography parameters of the listing; and
   calculating the performance score based on the geography type boost in addition to the relevancy score, the expected click through rate, and the content density boost.

15. A system, comprising:
   a computing device that is configured to:
   receive a search query;
   identify one or more listings responsive to the search query;
   determine, for each of the one or more listings, a relevancy score based on one or more parameters in the search query, an expected click through rate, and a content density boost for a listing category that is a ratio of a click-through rate when a particular type of field is included in a listing in the listing category to a click-through rate when the particular type of field is excluded from a listing in the listing category; and calculate, for each of the one or more listings, a performance score based at least in part on the relevancy score, the expected click through rate, and the content density boost.

16. The system of claim 15, the computing device further configured to calculate, for each of the one or more listings, a rank score based on the performance score for the listing and a maximum bid amount for the listing.

17. The system of claim 16, the computing device further configured to sort the one or more listings according to the rank score calculated for each of the one or more listings, and providing the one or more sorted listings in response to the search query.

18. The system of claim 15, the computing device further configured to apply one or more weighting factors to at least one of the relevancy score, the expected click through rate, and the content density boost, when calculating the performance score.

19. The system of claim 15, wherein the expected click through rate for a listing is normalized according to a position of the listing in a set of listings when the listing was selected.

20. The system of claim 15, the computing device further configured to adjust the content density boost based on at least one of the one or more parameters in the search query.

21. The system of claim 15, the computing device further configured to:
   determine, for each of the one or more listings, a geography type boost that is based on a comparison of one or more geography parameters of the search query to one or more geography parameters of the listing; and
   calculate the performance score based on the geography type boost in addition to the relevancy score, the expected click through rate, and the content density boost.

* * * * *